UNITED STATES PATENT OFFICE.

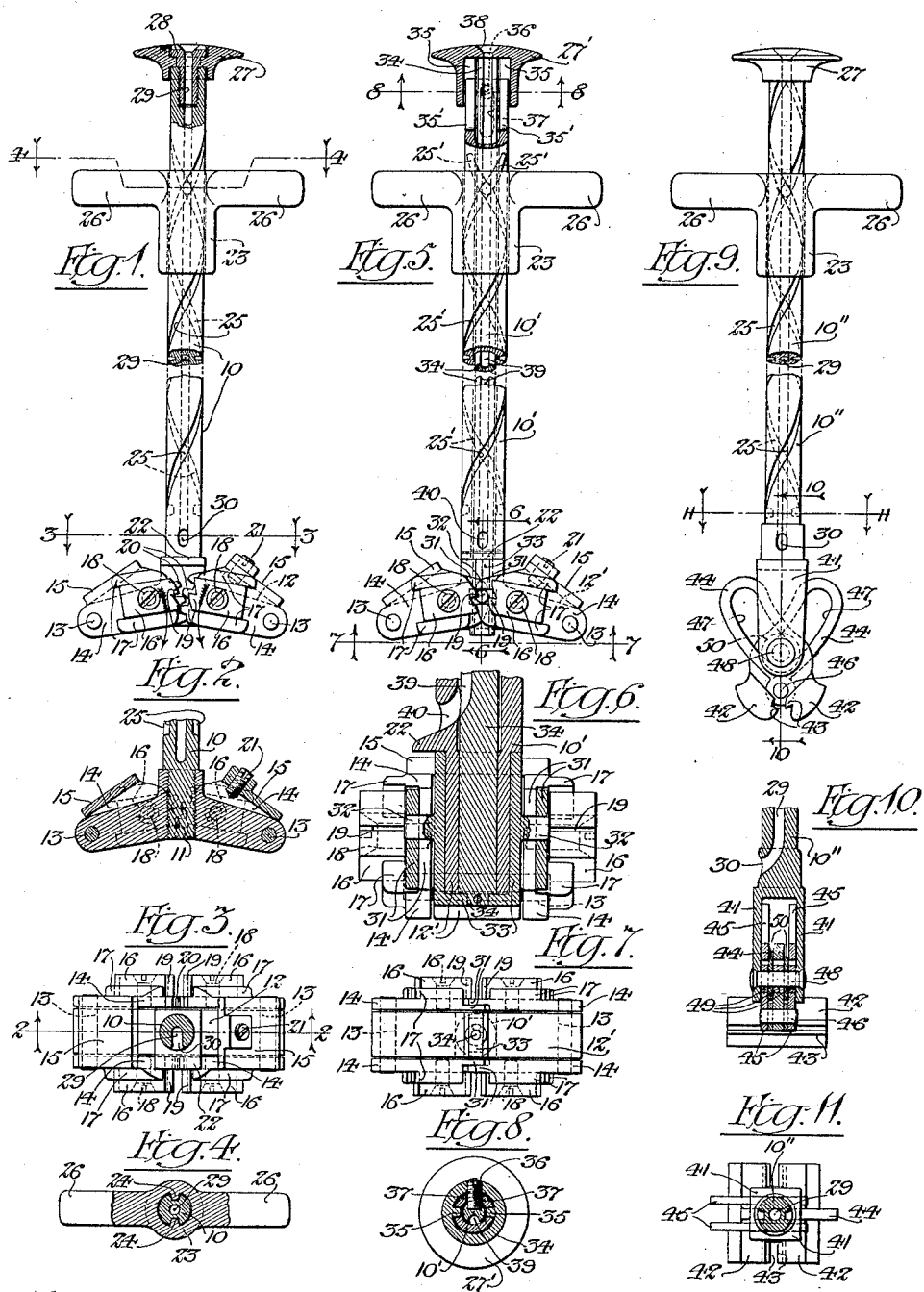

TIERNEY A. O'ROURKE, OF NEW YORK, N. Y.

TOOL FOR TWISTING AND CUTTING WIRE TIES.

1,084,103.  Specification of Letters Patent.  Patented Jan. 13, 1914.

Application filed March 28, 1912.  Serial No. 686,808.

*To all whom it may concern:*

Be it known that I, TIERNEY A. O'ROURKE, a citizen of the United States, and a resident of the city of New York, county and State of New York, have invented certain new and useful Improvements in Tools for Twisting and Cutting Wire Ties, of which the following is a full, clear, and exact description.

The invention relates to tools for twisting and severing wire ties and seeks to provide a simple and effective construction which can be used by hand to twist together the ends of a wire tie and to sever the same from a continuous length of wire.

The invention consists in the features of improvement hereinafter set forth, illustrated in different modified forms in the accompanying drawing and more particularly pointed out in the appended claims.

In the drawings, Figure 1 is a view partially in side elevation and partially in longitudinal section of one form of the improved tool. Fig. 2 is a section of the end of the tool taken on the line 2—2 of Fig. 3. Figs. 3 and 4 are cross-sections on the lines 3—3 and 4—4, respectively of Fig. 1. Fig. 5 is a view similar to Fig. 1, illustrating another form. Fig. 6 is a section on the line 6—6 of Fig. 5. Fig. 7 is an inverted plan view looking in the direction of the arrows 7—7 of Fig. 5. Fig. 8 is a cross-section on the line 8—8 of Fig. 5. Fig. 9 is an elevation of a further modification. Figs. 10 and 11 are sections on the lines 10—10 and 11—11, respectively, of Fig. 9.

The improved tool comprises a spindle and a pair of coöperating jaws mounted on the spindle and provided with working portions on opposite sides of the axis of the spindle. Suitable means, such as a handnut, are provided for rotating the spindle and the jaws and the latter are shiftable to grip the ends of the wire tie and also to sever the tie from a continuous length of wire.

The form shown in Figs. 1 to 4, inclusive, comprises a spindle 10 having a reduced end portion 11 which is threaded through the central opening of a cross-head 12. The two arms or portions of the transverse crosshead 12 are preferably inclined away from the spindle to a slight extent, as most clearly shown in Fig. 2. A pair of coöperating jaws are connected by pivot pins or pintles 13 to the outer ends of the cross-head 12. Each of these jaws is U-shaped and comprises side portions 14 and a connecting portion 15 which extends between the sides of the jaw and over one of the arms of the cross-head 12. The jaws extend inwardly from pivots 13 and are provided on opposite sides of the axis of the spindle 10 with working portions for gripping and cutting the wire ties. The working portions or faces of the jaws are preferably formed upon separate knife pieces 16 of hardened steel. Each side of each jaw is provided with projecting parallel lugs 17 and one of the knife pieces 16 fits between each pair of lugs and is secured in position by a screw 18. The knife pieces on each side of the spindle are provided with coöperating clamping and cutting edges or teeth 19. The side portions 14 of the jaws are also provided at their inner ends with intermeshing gear teeth 20 which hold the jaws in proper position, so that the knife edges 19 of the jaws will properly register. An adjusting screw 21 threaded through the portion 15 on one of the jaws is arranged to engage the crosshead 12 and limit the outward movement of the jaws. The inward movement of the jaws is limited by a laterally projecting stop lug 22 on the inner portion of the cross-head.

The spindle and jaws are rotated to twist the ends of the tie wire together by a handnut 23 which is slidably mounted on the spindle 10 and, in the form shown, is provided with inwardly projecting lugs 24 engaging spiral grooves or threads 25 of long pitch formed in the cylindrical surface of the spindle. The nut is also provided with laterally projecting finger pieces or handles 26 by which it may be conveniently shifted to rotate the spindle. At its upper or outer end, the spindle is provided with a knob 27 which fits upon the end of the spindle and is rotatably secured thereto by the headed screw 28. The screw 28 and the spindle 10 are preferably provided with a central longitudinal bore 29 which opens at 30 on one side of the spindle and in line with the working portions of the jaws.

In operation the hand-nut 23 is moved to the outer or lower end of the spindle and a length of wire is passed through the bore 29 and out through the opening 30. The end portion of the length of wire is passed between the knife edges 19 on one side of the jaws, then around the article or articles to be bound together by the tie and the free end of the wire is placed between the knife edges 19 on the opposite side of the jaws. The knife edges 19 firmly grip the ends of the tie and by drawing the hand-nut 23 outwardly toward the knob 27, the spindle and jaws thereon are rotated to twist the ends of the wire together. When the hand-nut reaches the end of its outward movement or when it strikes the knob 27, the spindle 10 and cross-head 12 thereon are shifted longitudinally so that the jaws, which grip the ends of the tie, are swung about the pivots 13, as indicated by the arrows in Fig. 1 to bring the knife edges together and sever the ends of the tie. The length of wire is then advanced through the bore of the tool sufficiently to form another tie. In this way the ties may be readily applied, the ends thereof twisted together and the ties successively severed from a continuous length of wire. Furthermore, it is unnecessary to provide the ties with loops or hooks at their ends for engaging a twisting tool. The improved tool is conveniently used for placing ties about the necks of bags or about bundles of metal rods or the like. It can also be conveniently used for fastening together the metal rods used for reinforcing concrete and for similar purposes.

In the form shown in Figs. 5 to 8, inclusive, the head 12' is formed in one piece with the spindle 10'. The combined gripping and cutting jaws are similar in construction to those previously described, except that they are provided at their inner ends and inside of the knife portion 16 with notched lugs 31, instead of with gear teeth as in the form shown in Fig. 1. The notched lugs 31 overlap, as shown, and a pair of laterally projecting pintles 32 engage the notches of these lugs. These pintles are formed upon the sides of a U-shaped piece 33 which extends about the central portion of the head 12' and slides longitudinally in guide-ways formed upon the sides of the head. The central portion of the U-shaped piece 33 is connected to the lower end of a rod 34 which extends longitudinally through the bore of the spindle 10'. The upper or outer end of the rod 34 projects beyond the end of the spindle 10' and engages a knob 27'. The latter is provided with inwardly projecting longitudinal ribs or lugs 35 (see Fig. 8) which engage grooves 35' (see Fig. 5) in the upper portion of the spindle 10'. A set screw 36 threaded through the knob extends through a slot 37 in the spindle and holds the knob in position, but permits the longitudinal movement thereof with respect to the spindle. In the form shown the set screw 36 also engages the rod 34. The knob 27' is provided with an opening 38 which communicates with the upper end of a longitudinal groove 39 on one side of the rod 34 and which groove terminates opposite an opening 40 in the side of the spindle adjacent the inner ends of the jaws. In operation, a length of wire is passed through the opening 38, groove 39 and opening 40, thence through the working portions on one side of the jaws around the article or articles to be tied and through the working portions on the opposite side of the jaws. The hand-nut 23 is then drawn outwardly to rotate the spindle 10' and jaws thereon, as before, to twist the ends of the wire together. In this form, the spiral grooves or threads 25' of sharp pitch terminate short of the end of the spindle to arrest the movement of the hand-nut 23. When the movement of the hand-nut relatively to the spindle is thus arrested, the further movement of the hand-nut tends to shift the spindle in longitudinal direction. But the knob 27' is pressed against the palm of the other hand of the user so that the rod 34 and the inner ends of the jaws, to which the latter is connected by the part 33, are held against longitudinal movement and the jaws are thus swung about the pivot pins 13 to force the knife edges 19 past each other to sever the ends of the wire.

It should be noted that, in both forms described, the jaws are arranged slightly above a line drawn between the pivot pins 13 so that the knife edges 19 of the jaws are forced together by a kind of toggle leverage so that they can easily sever the ends of the tie wire.

In the form shown in Figs. 9 to 11, inclusive, the spindle 10'', nut 23 and knob 27 are similar in construction to the corresponding parts of the form shown in Figs. 1 to 4, inclusive. At its lower end, in this form, the spindle is provided with a forked or bifurcated head comprising longitudinally extending side portions 41. A pair of transversely disposed jaws 42 having coöperating working portions or knife edges 43 are mounted upon the arms or side portions 41 and project laterally on either side thereof, as shown in Figs. 10 and 11. One of the jaws is provided with a single arm or lever 44 which extends between a pair of arms or levers 45 upon the other jaw. These arms or levers are connected at a point adjacent the knife edges 43 by a pivot pin 46. These arms also extend between the side portions 41 on the end of the spindle and are provided with longitudinal cam slots 47 and a pintle 48 fixed to the lower ends of the side portions 41 extends through these cam slots. A series of rollers 49 are mounted on the spindle 48 between washers 50 and engage the walls of the cam slots 47.

In use, in the form shown in Figs. 9 to 11, inclusive, the wire passes, as before, through the longitudinal bore 29 between the jaws on one side of the spindle, thence around the article or articles to be tied and between the jaws on the opposite side of the spindle. The hand-nut 23 is then drawn from the lower or outer end of the spindle to the upper end thereof to rotate the jaws and twist the ends of the tie together. When the hand-nut 23 strikes the knob 27 the spindle is shifted in longitudinal direction away from the jaws and the rollers 49 on the spindle 48 are drawn through the cam slots 47. The jaws are thus forced together so that the ends of the wire are cut off by the knife edges 43.

In each form shown, the spindle is rotated by a longitudinally movable hand-nut and is provided with a pair of combined gripping and cutting jaws which, at the end of the rotary movement of the tool for twisting the tie wire, are shifted by the relative longitudinal movement of the spindle to sever the tie from a continuous length of wire. In the preferred embodiment of the invention, as set forth, the rotation of the spindle and jaws to twist the tie and the relative movement of these parts for severing the tie are both effected by the longitudinal movement of the hand-nut from the outer to the inner end of the spindle. It is obvious, however, that numerous changes may be made in the details of construction set forth, without departure from the essentials of the invention as defined in the claims.

I claim as my invention:—

1. A portable hand tool for twisting and severing wire ties comprising a spindle, means for rotating said spindle, and jaws mounted on said spindle and having working portions on opposite sides of the axis of the spindle, one at least of said jaws being movable to grip the ends of the tie and sever the same from a length of wire, substantially as described.

2. A tool for twisting and severing wire ties comprising a spindle, a hand nut for rotating said spindle, and combined gripping and cutting jaws mounted on said spindle and having working portions on opposite sides of the axis thereof, said jaws being relatively movable together and apart to grip the ends of the tie and sever the same from a continuous length of wire, substantially as described.

3. A tool for twisting and severing wire ties comprising a spindle having a longitudinal passage therethrough for a length of wire, a hand-nut on said spindle for rotating the same, and combined gripping and cutting jaws mounted on the end of said spindle and arranged to engage the ends of the tie at points on opposite sides of the axis of the spindle, substantially as described.

4. A tool for twisting and severing wire ties comprising a spindle, means for rotating the same, and a pair of combined gripping and cutting jaws movably mounted on said spindle to rotate therewith and having working portions on opposite sides of the axis of the spindle, both of said jaws being shiftable relatively to said spindle to grip and sever the tie wire, substantially as described.

5. A tool for twisting and severing wire ties comprising a spindle, means for rotating the same, and a pair of combined gripping and severing jaws movably mounted on said spindle to rotate therewith and having working portions on opposite sides of the axis of the spindle, both of said jaws being shiftable relatively to said spindle to grip and sever the wire, and means for holding said jaws in proper relative position, substantially as described.

6. A tool for twisting and severing tie wires comprising a spindle, means for rotating said spindle, a pair of combined gripping and cutting jaws mounted on said spindle to rotate therewith and arranged to be actuated by the relative longitudinal movement of said spindle, said jaws having working portions on opposite sides of the axis of the spindle, substantially as described.

7. A tool for twisting and severing tie wires comprising a spindle, a hand-nut for rotating said spindle, a coöperating pair of combined gripping and cutting jaws mounted on one end of said spindle to rotate therewith and arranged to be shifted together and apart by the movement thereof relatively to said spindle in axial direction, said jaws being arranged to engage the ends of the tie at points on opposite sides of the axis of the spindle, and means for holding said jaws in proper relative position.

8. A tool for twisting and severing wire ties comprising a spindle, a hand-nut for rotating said spindle, a cross-head fixed to one end of said spindle, and a pair of coöperating jaws pivoted to the ends of said cross-head and extending inwardly and upwardly therefrom, said jaws having gripping and cutting edges at their inner ends and on opposite sides of the axis of the spindle, substantially as described.

9. A tool for twisting and severing wire ties comprising a spindle, a hand-nut for rotating said spindle, a cross-head fixed to one end of said spindle, a pair of coöperating jaws, pivoted to the ends of said cross-head, extending inwardly and upwardly therefrom and having gripping and cutting edges at their inner ends and on opposite sides of the axis of the spindle, means for holding said jaws in proper relative position, and stops for limiting the movement of said jaws relatively to said spindle, substantially as described.

10. A tool for twisting and severing wire ties comprising a spindle, a hand-nut for rotating said spindle, a cross-head fixed to one end of said spindle, a pair of coöperating jaws, pivoted to the ends of said crosshead, extending inwardly and upwardly therefrom and having gripping and cutting edges at their inner ends and on opposite sides of the axis of the spindle, and a stem extending through said spindle and connected to the inner ends of said jaws, substantially as described.

TIERNEY A. O'ROURKE.

Witnesses:
  DAVID HOMER HAYDEN,
  CECELIA M. O'BRIEN.

Copies of this patent may be obtained for five cents each, by addressing the "Commissioner of Patents, Washington, D. C."